United States Patent [19]

Carsner

[11] Patent Number: 5,505,513
[45] Date of Patent: Apr. 9, 1996

[54] CONVERTIBLE BED/SEAT FOR VEHICLE

[76] Inventor: Danny W. Carsner, 117 E. Jefferson St., New Carlisle, Ohio 45344

[21] Appl. No.: 266,124

[22] Filed: Jun. 27, 1994

[51] Int. Cl.⁶ ........................................................ B60N 2/34
[52] U.S. Cl. .................................... 296/69; 5/35; 5/118
[58] Field of Search ............................... 296/65.1, 63, 69, 296/169, 174; 5/28, 29, 35, 118, 119, 922

[56] References Cited

U.S. PATENT DOCUMENTS

| | | | |
|---|---|---|---|
| 3,317,238 | 5/1967 | Smoll | 296/69 |
| 4,443,034 | 4/1984 | Beggs | 296/65 R |
| 4,620,335 | 11/1986 | Dogden | 5/118 |

Primary Examiner—Dean Kramer
Attorney, Agent, or Firm—William Weigl

[57] ABSTRACT

A truck camper having a large, flat truck bed and a top cover or shell is provided with a unit of furniture which is manually convertible between bed form and seat form. It consists of three essentially-rectangular elongated platforms hinged at adjacent side edges and extending crosswise of the unit. Each platform has legs at its opposite ends, providing for gear storage beneath the raised unit. The platforms are manually movable in Z-folded fashion between a vertically-stacked condition in which they form a seat and a horizontally-extended condition in which they form a sleeping bed raised above the truck floor. A cushion is provided for each platform, two serving as a seat and the third forming the back of the seat when in seat form. When in the latter form, 4 foot by 8 foot building construction panels can be placed the full length of the truck bed beneath the seat and between its legs.

17 Claims, 3 Drawing Sheets

CONVERTIBLE BED/SEAT FOR VEHICLE

This invention relates generally to furniture used on a flat floor in a vehicle such as a pick-up truck or van, and in particular, to a Z-folded attached series of platforms which can be extended horizontally into bed form or stacked vertically into seat form.

BACKGROUND OF THE INVENTION

Vehicles adapted with sleeping facilities, either as a dedicated bed or as a seat converted into a bed have been known for many years, at least since the 1920's. Most, if not all, require considerable alteration to the vehicle in order to achieve that goal. Accordingly, if vehicle alteration is necessary, each manufacturer's product requires a different design. Oftentimes, different models of vehicles from the same manufacturer require special design treatment for each model.

Most persons who use a truck camper for sleeping purposes have either a padded or an inflatable mattress lying directly on the truck bed. In colder weather, regardless of which type of mattress is used, conduction of cold through the metal truck bed and even through a plastic liner between the truck bed and mattress can cause personal discomfort and loss of sleep. Many outdoor sportsmen such as campers, fishermen and game hunters also found that placement of wet gear on or near the mattress usually creates condensation on a plastic inflatable mattress and sometimes dampens a padded mattress, causing either one to become cold and clammy. To avoid this, they must either store their gear in the cab of the truck, or leave it outside, unsecured.

SUMMARY OF THE INVENTION

A truck camper having a large, flat truck bed is provided with a unit of furniture which is manually convertible between bed form and seat form. It can be produced in a simple, single design and in only a few size variations for practically all standard American-built pick-up trucks, without truck alteration or conversion. In reduced widths, it is also useful as a single bed in small trucks, vans and other sports utility vehicles having a flat surface. It consists of three essentially-rectangular elongated platforms hinged adjacent their side edges and extending crosswise of the unit. Each platform has legs at its opposite ends. The platforms are manually movable in Z-folded fashion between a vertically-stacked condition in which they form a seat and a horizontally-extended condition in which they form a sleeping bed raised above the truck floor. The platforms may be said to nest when stacked in seat form. When in bed form, storage space is provided beneath the bed for various things such as fishing and bunting equipment, boots, clothing and other outdoor gear. A cushion is provided for each platform, two serving as a seat and the third forming the back of the seat. When in seat form, 4'×8' building construction panels can be placed the full width of the truck bed beneath the seat and between those of the seat legs supported on the truck floor.

A principal object of this invention is to provide a bed for a standard pick-up truck having a camper shell or top, which bed raises a resting person above the surface of the truck floor. An ancillary object is to provide storage space beneath the bed for outdoor sports equipment and other gear or supplies.

Yet another object is to enable conversion of the bed to seat form, providing full truck height storage over that area of the truck floor formerly occupied by the lower two-thirds of the sleeping bed.

An important object of the invention is to provide for nesting of leg structure for the foot end of the bed with other segments of the structure when it is converted from bed form to seat form.

Still another object of the invention is to achieve all of the foregoing objects without requiring any modification or alteration to the structure of the truck.

Another object is to enable use of the pick-up truck to carry standard 48 inch wide sheet building materials such as plywood, wallboard and the like with the unit in place in the truck and positioned in seat form.

Another object is to provide a convertible bed/seat capable of extending to at least a six foot length when in bed form, and to be the proper normal depth when in seat form to allow a user to sit back against an upright cushion.

A further object is to provide a convertible bed/seat with multiple sections which are extendable and retractable, and with minimum vertical space being required to move the sections between their two positions.

Yet another object is to provide a floor-supported multiple interconnected-section convertible bed/seat wherein one section between wheel wells of a pick-up truck is provided with legs supporting the section off the truck floor when in sleeping bed form, but wherein, when the unit is placed in seat form, said one section is inverted and its legs face upwardly and are off the truck floor.

Other objects and advantages will become apparent from the following description, in which reference is made to the accompanying drawings.

DESCRIPTION OF THE PREFERRED EMBODIMENT

Since my invention was originally designed for use in a covered truck camper by sportsmen and campers, it will be described in that manner. It is to be understood, however, that the furniture unit may also be used in other types of vehicles provided sufficient floor space is available. Additionally, the unit is portable and may be easily moved from a camper to a tent, if desired.

Figure 1:
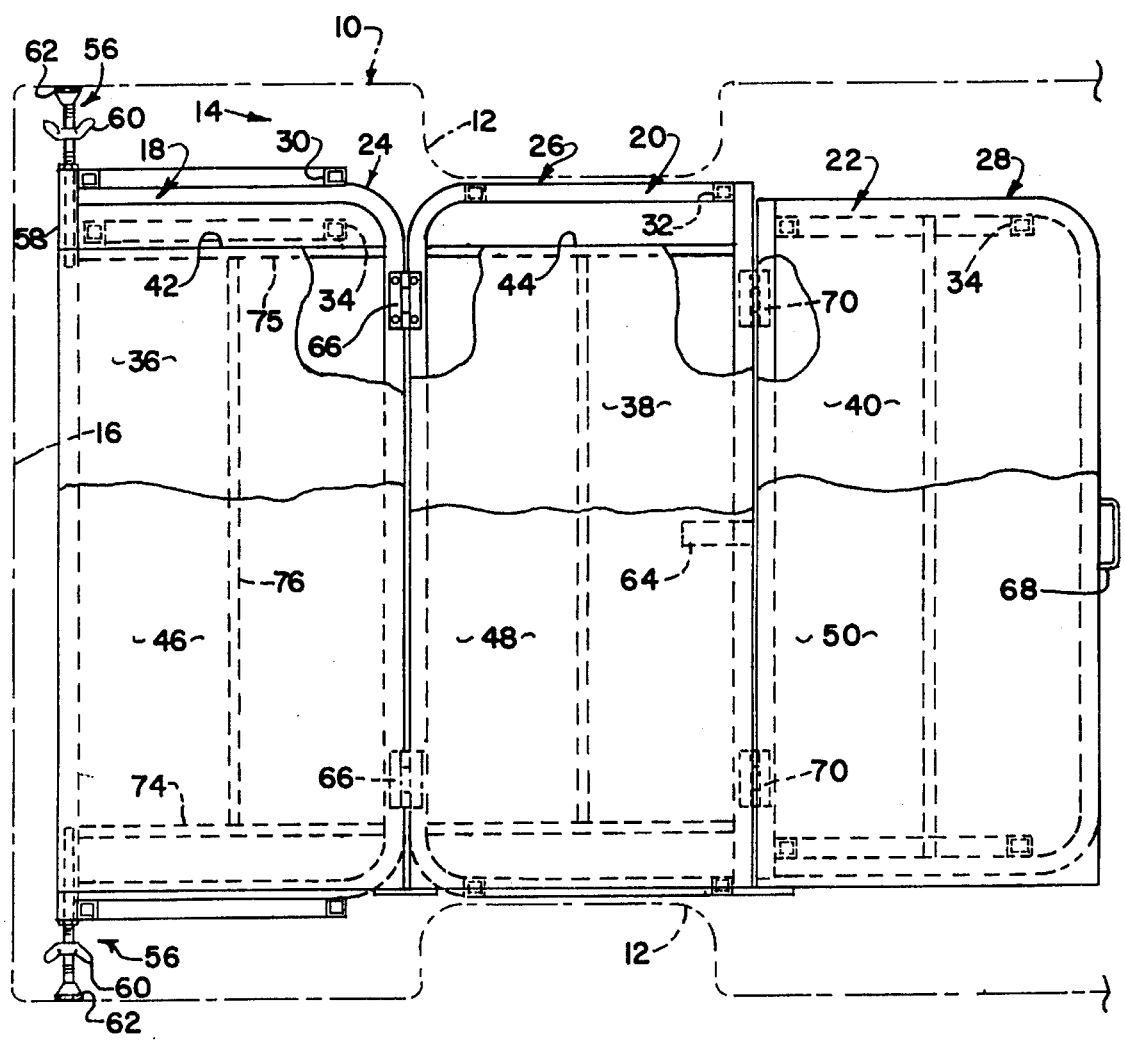
FIG. 1 is a partly-fragmentary plan view of the unit extended into bed form on a truck bed, with the cab end of the truck being located at the left and the tailgate end at the right of the Figure.

A floor outline of a truck bed is shown in dot-dash lines at 10 in the plan view of the unit in FIG. 1. The outline of the truck bed is of significance because of the conventional wheel wells 12 which are common to such trucks and protrude inwardly and upwardly approximately midway between the driver's cab and the truck tailgate. The wheel wells of a standard truck are conventionally laterally spaced apart about forty-nine inches so that standard sheet-type building materials such as plywood, rock lath, masonite, etc., may be carried flat on the truck floor. This capability is desired to be retained, even with my unit in place in the camper. Standard dimensions for such materials are 4 feet by 8 feet, allowing about one-half inch width clearance between the inner sides of the wheel wells 12 when the materials are laid flat on the truck bed floor. A prime consideration of my design of a combination bed/seat 14 (hereinafter also referred to on occasion as "unit" or "furniture") is to maintain the capability of carrying building materials with the furniture in place in the truck. Plastic liners, (not shown), are also available for the truck beds of the most popular models. It is to be understood also that the bed/seat unit 14 is designed to fit into such liner and still provide the required clearances about to be described. The truck bed 10 has a cab wall 16, at which end I prefer to place the head-end of the unit 14 when in bed form as shown in FIG. 1. At its end opposite the cab wall 16 is the conventional tailgate (not shown). The tailgate extends beyond the foot end of the bed approximately eight inches for a "short bed" truck and about two feet for a full-size pick-up truck.

Figure 4:
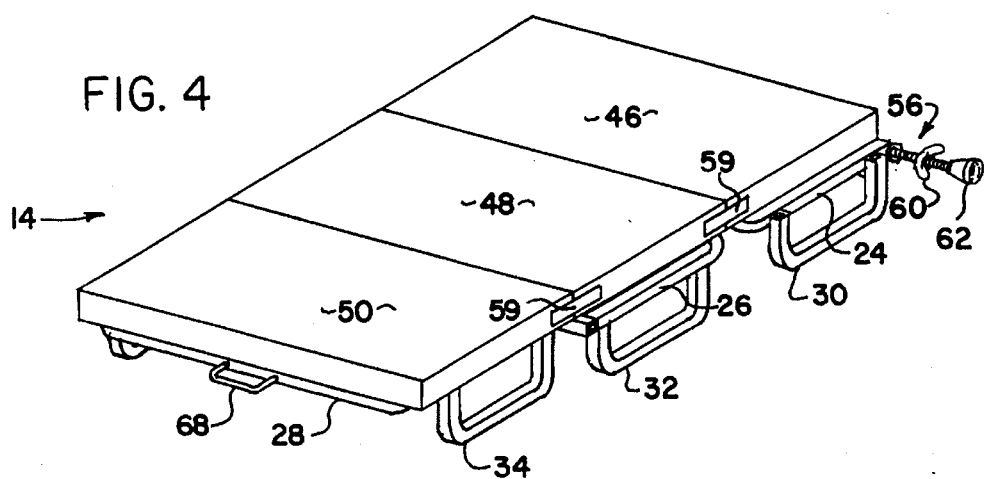
FIG. 4 is a reduced-size isometric view of the unit when placed in bed form and is taken from above the upper right hand corner of FIG. 1.
Figure 3:
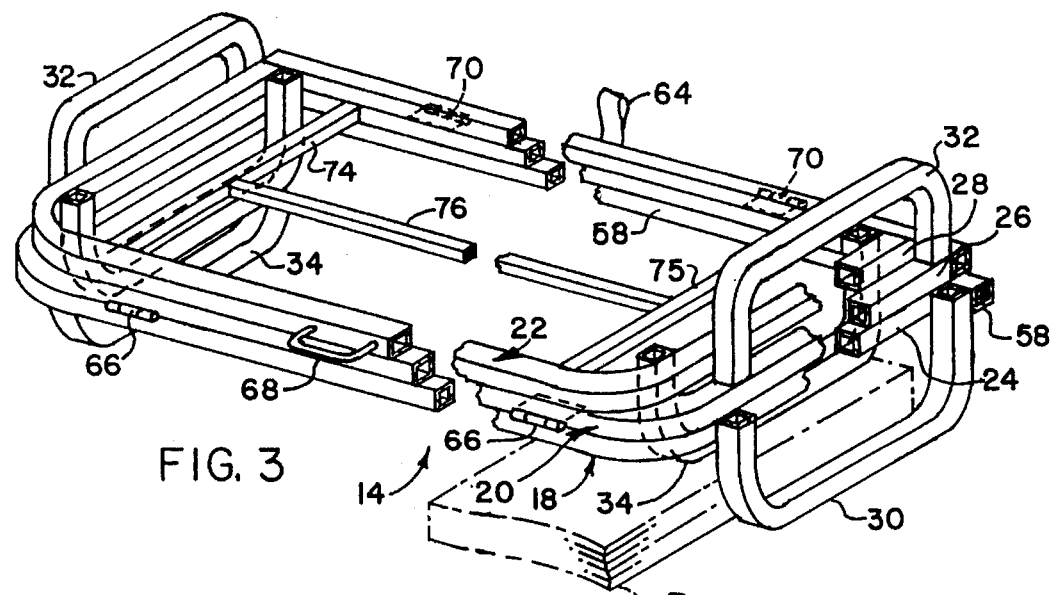
FIG. 3 is an enlarged isometric view of the unit in seat form, with its cushions and body-supporting surfaces removed in order to better illustrate the manner in which the platforms can nest.
Figure 2:
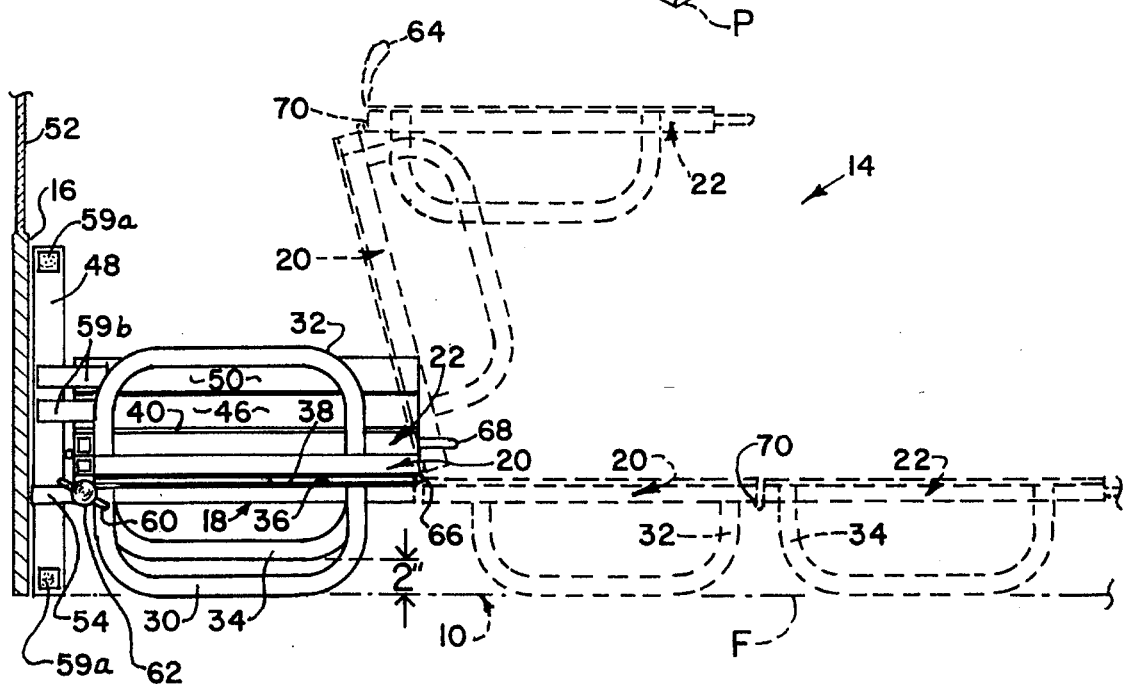
FIG. 2 is a side view looking upwardly from FIG. 1, with the unit being shown in seat form in solid lines and in dotted lines in both bed form and a position essentially midway between bed and seat form.

The unit 14, (which may be referred to as "bed 14" when in the bed form of FIGS. 1 and 4 and as "seat 14" when in the seat form of FIGS. 2 and 3), consists of a first platform 18, a second platform 20 and a third platform 22. Primary essentially-rectangular supporting frames 24, 26 and 28 are provided for the first, second and third platforms respectively. The frames 24, 26 and 28 are preferably one-inch square steel tubing, although other materials such as aluminum may be used if additional weight reduction is desired and some of the strength of steel is willing to be sacrificed. Steel is preferred for ease of welding into relatively rigid structural supporting members. While square tubing has design advantages, other cross-sectional shapes are also feasible. Each frame has a pair of legs at opposite ends, designated 30, 32 and 34 respectively for frames 24, 26 and 28. The legs are preferably produced in U-shape configuration, being essentially rectangular with an approximate three inch radius at each corner. The distal ends of each leg of the U is welded to its respective frame, as can be seen more clearly in FIG. 2. It will be noted from the plan view of FIG. 1 that the frames 24 and 26 are essentially mirror images, except for the location of the legs. The legs 30 are attached to the outside edges of the upper part of the frame 24 with the spacing between the inside edges of legs 30 exceeding 48 inches, while the legs 32 are positioned directly beneath the tubing at the ends of frame 26. It can be seen that legs 32 are just inside the wheel wells 12, which were stated to be about 49 inches apart. With the added two inches of width of the two legs 32 contacting the floor of the truck bed 10, the dimension between the inside edges of the legs 32 will not permit the placement of 48" wide building material beneath the bed 14. This requires that the legs 32 be removed from the floor by converting the bed into a seat. When this is done, as will be seen later, legs 32 are out of contact with the floor and no longer obstruct placement of 48" wide material on the truck bed.

Body-supporting surfaces 36, 38 and 40 in the form of relatively thin, flat, rectangular panels are attached across the sides of their respective frames 24, 26 and 28 and are supported by cross-braces at their undersides. Attachment may be accomplished by welding or by means of rivets or screws. Panels 36, 38 and 40 may be sheet material such as plastic, masonite or metal, the material selected being one which has little or no sag or noise when a person is resting on the bed or seat. It will be noticed that the end edges 42 and 44 of panels 36 and 38 are spaced inwardly from the ends of their respective frames. This provides a critical feature of my invention, the spacing being essential to allow nesting of legs 34 of third platform 22 within the spaces between the frames and the end edges 42 and 44 of the panels 36 and 38. For example, one leg 34 is shown in dotted lines inside the space at the upper left end of FIG. 1, it being understood that this condition exists only when the unit 14 is retracted from the bed form shown in FIG. 1 to the seat form shown in FIG. 2.

FIG. 2 illustrates in solid lines the positions of the platforms when in seat form. It can be seen that legs 34 are raised above the floor F of the truck bed 10 and the legs 32 of second platform 20 are inverted. With the particular construction employed, the distance is approximately two inches. At this time, plywood P (FIG. 3) or the like having a width dimension of four feet can be placed on the floor between legs 30 (which are resting on floor F) and beneath legs 34. If desired, depending on the height of the legs, several additional inches of sheet material can be placed beneath the seat 14, if third platform 22 is propped up above second platform 20. This can be accomplished by means of one or more cushions 46, 48 and 50. These cushions are shown in place as a mattress in FIG. 4 when the unit is in bed form, and as seat cushions 46 and 50 and back cushion 48 when in seat form. If one or more cushions are located between platforms 20 and 22 when moved from bed toward seat condition, obviously, the legs 34 cannot extend downwardly as far as is shown in FIG. 2, and additional height clearance can be provided beneath the seat 14 to enable transporting of a higher stack of sheet materials than two inches. The radius at the bottom of legs 34 allows for more clearance than would be possible if the corners of the legs were square. The radiused portions of frames 24, 26 and 28 also provide an esthetically-pleasing rounded appearance to the front corners of the seat 14, as is more apparent from FIG. 3.

FIG. 2 also illustrates how manual conversion to and from bed form and seat form is accomplished. The seat 14 is preferably located and held in place against the cab wall 16. The opposite or left side of the cab wall 16 is typically where the back of the driver's seat is located, facing leftwardly toward the front of the truck. A rear-view window 52 is located part way up the wall 16. Cushion 48 may be placed vertically at the left of the seat, ideally below the window 52 to enable the driver to see through the window. Spacers 54 of any kind may be used to distance the seat the proper amount from the wall 16 for receipt of the cushion 48. Those spacers shown are fastened to the frame, either permanently, adjustably or removably. A simple wooden 2×4 can be also substituted for the spacers, being laid on the floor and the seat pushed against it.

The sides of the bed are braced against the side walls of the truck interior by means of adjustable threaded members 56. These brace members may include screws threaded into nuts attached in the hollow openings of a square tubular bar 58 which forms the outer edge of the first frame 24. A wing nut 60 or other torque-applying member may be welded to each screw to turn it in or out of its respective nut. A rubber pad 62 is carried on the outwardly-extending end of each screw member 56 to avoid the possibility of damage to the inside of the truck or the truck bed liner as the screws are tightened. These members brace and line up the unit 14 laterally, and the unit can remain that way indefinitely unless it is to be removed either for placement in a tent or cleaning the truck interior.

The seat 14 is shown fully assembled with cushions in place in FIG. 2. The space for seating is approximately a two foot depth from the front edge of the seat to the cushion 50, the cushions preferably being 24 inches wide and 48 inches in length. This provides adequate seating space for two persons, as well as provides a standard bed 4 feet wide and 6 feet long when converted to bed form as shown in FIG. 4. The cushions may be provided with any common means such as releasable Velcro straps 59 for attaching them together when in bed form to retain the cushions 46, 48 and 50 together as a one-piece mattress. Each strap 59 consists of a hooked portion 59a and a cloth portion 59b, seen separately at the left of FIG. 2. Portions 59a may be on cushion 48 while portions 59b may be on cushions 46 and 50. This allows them to be "out-of-the-way" when the unit 14 is in seat condition.

The design is intended to enable ease of manual movement of the unit between bed and seat form. When in seat form, the person manipulating the unit locates a lifting strap 64 and pivots platforms 20 and 22 about hinges 66 which interconnect first and second platforms 18 and 20 on their topsides. Simultaneously, the foot end of the third platform 22 is also taken by handle 68, swinging platform about hinges 70 located on the underside of and interconnecting second and third platforms 20 and 22. When first lifted, the unit is seen to be in a "Z" condition as shown at the upper side of FIG. 2 and can be said to be Z-folded when moving to and from one position or the other. At the time the movement is being accomplished, there is adequate clearance of the top cover or shell of the truck. The mover can either bend over and walk the unit during Z-folding, or can keep generally upright and move on their knees. The entire unit 14 weighs approximately fifty pounds when steel is employed as the main frame construction, and since only the second and third platforms 20 and 22 are moved and are fulcrumed about the hinges 66, the operation is easy to accomplish for a male of normal strength. After the final bit of movement, the bed 14 rests on the truck floor F, fully extended as in dotted lines in FIG. 2 and in solid lines in FIG. 4. The cushions 46, 48 and 50 are shown as then having been placed on the platforms in FIG. 4, fastened together by straps 59 to retain their mattress shape, and the bed 14 is ready for either a couple of sleeping bags or a sheet and blankets. The 72 " by 48" size of bed is considered to be a "full size" bed in camping and recreational vehicle literature and supply catalogs.

When the unit is subsequently returned to seat form, e.g., when preparing to travel again, the cushion 48 is positioned on edge vertically to become the back of the seat. Cushion 46 is then flipped over and stacked onto cushion 50 on platform 22, strap 64 and handle 68 are grasped, and the second and third platforms are Z-folded leftwardly toward the cab end of the truck as viewed in FIG. 2. The legs 34 pass through the spaces between the ends 42 and 44 of the panels 38 and 40 and ends of their respective frames as the platforms come together. Cushions 46 and 50 thus lie between and are restrained against lateral movement by the inverted legs 32. The legs 32 hold cushions 46 and 50 fairly tightly so that they do not move during riding. It is preferable for stability purposes to have the unit in seat form during traveling, but use of the seat while the truck or other vehicle is travelling is recommended against.

FIG. 3 illustrates the frames and legs of the three platforms without the panels 36, 38 and 40 in position and with cross-braces 74–76 being shown only for the third platform 22 for clarity. Similar cross-braces are provided for each platform in order to support the panels 36, 38 and 40 and the person or persons resting on them. If relatively rigid panels are used, it may not be necessary to use cross-bracing. FIG. 3, when viewed in conjunction with others of the Figures, will show clearly how the legs 34 can be said to nest with vertical spaces that are inwardly of the legs 30 and 32 of the first and second platforms 18 and 20.

FIG. 4 shows a mattress consisting of the cushions 46, 48 and 50. For most pick-up trucks, the dimensions of the mattress are 48" wide by 72" long. This fits between the wheel wells 12 and is quite adequate for sleeping two average-size adults in most instances. Some truck models may require smaller overall dimensions, but in all instances, the design would be the same and would therefore eliminate any necessity to alter or modify the internal structure of the truck.

Figure 5:
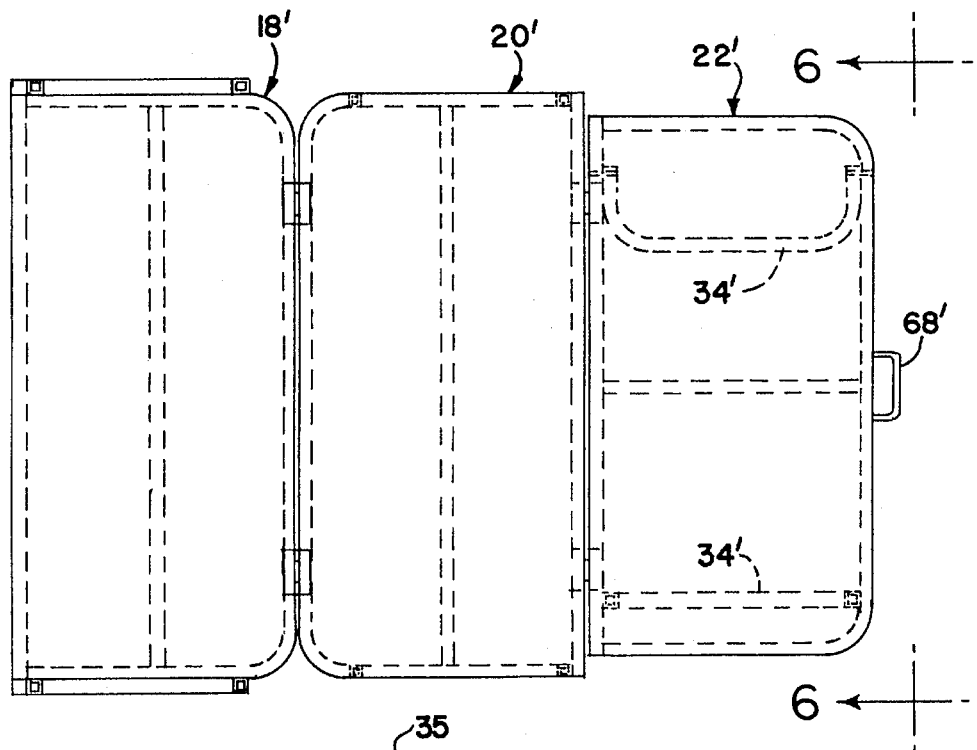
FIG. 5 is a plan view of a modified version of the convertible unit extended in bed form.
Figure 6:
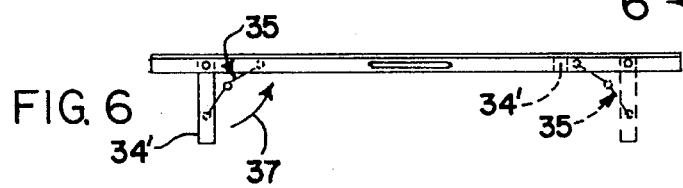
FIG. 6 is an elevational end view taken along lines 6—6 of FIG. 5.

FIG. 5 illustrates a modification of the unit 14 In which platforms 18', 20' and 22' are essentially similar to the correspondingly-numbered platforms of FIG. 1. The primary differences are in the absence of the vertical leg clearance spaces at the ends of the first and second platforms and in the addition of the feature of inward collapsibility of the legs 34'. Instead, as shown in FIG. 6, the legs 34' may be provided with link hinges 35 such as those commonly used for card tables. This allows the legs 34' to be moved from a locked upright position shown at the left of FIG. 6 in the direction of arrow 37 to a collapsed horizontal position shown at the right end of FIG. 6. When collapsed, they lie totally within the vertical thickness of the frame of the third platform, and therefore face the underside of platform 20' when the unit is placed in seat form. This version of my invention provides more body surface area than the FIG. 1 version, but requires additional manual motions to be performed when converting the unit between bed and seat form.

Figure 7:
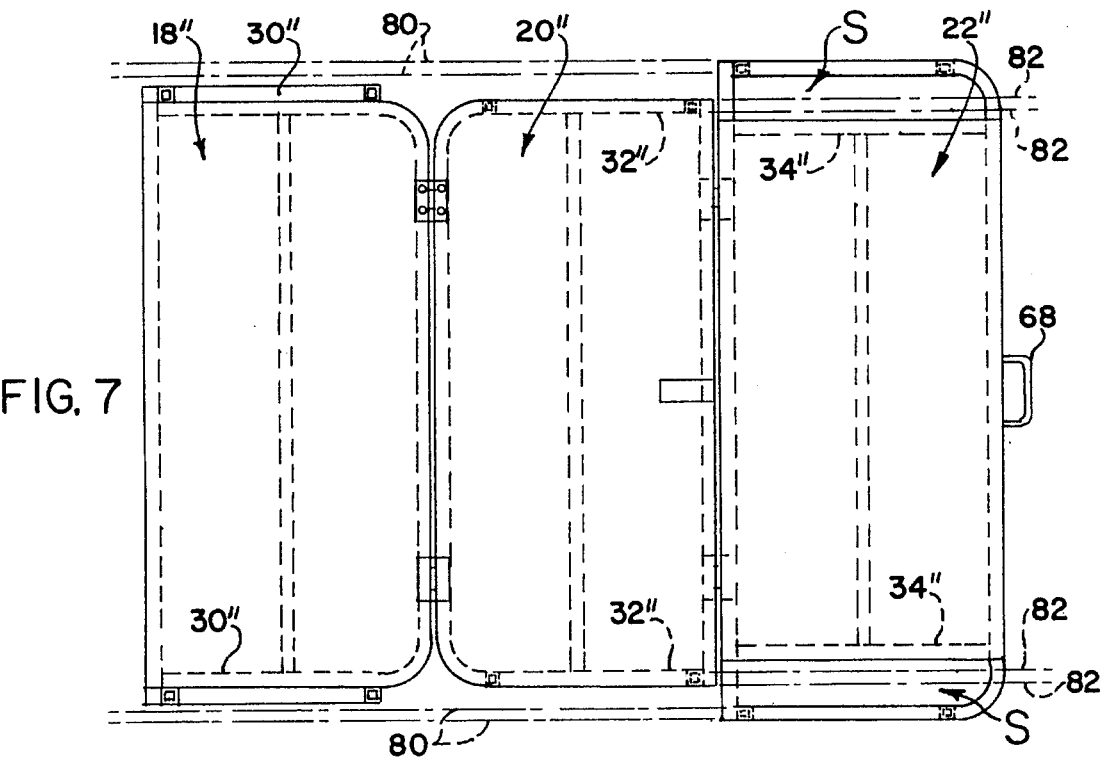
FIG. 7 is a plan view similar to that of FIG. 5 illustrating still another modification of the invention.

FIG. 7 utilizes the vertical leg clearance space feature of the FIG. 1 version, but provides such clearance space in third platform 22" instead of the other two platforms. It also requires that the legs 34" be spaced so as to be outboard of legs 30" of the first platform 18" as well as have vertical spaces S align with legs 32" of second platform 20". Dot-dash lines 80 extend leftwardly from legs 34" to illustrate how they clear legs 30", and dot-dash lines 82 extend rightwardly from legs 32" to show how spaces S clear over legs 32" when they are inverted in seat form.

While it is preferred to provide legs under all three platforms, in some instances, legs may be omitted beneath the second platform where the wheel wells of certain truck models enable the second platform to rest on the upper surfaces of the wheel wells or bed liner. Legs 32 also provide the cushion-retaining feature when in seat form and are therefore preferred to be present in the design, although not essential.

Various other changes may be made in the design, the materials used and the manner of Z-folding and firmly positioning the unit in the truck, without departing from the spirit and scope of the claims.

Having described my invention, I claim:

1. A manually convertible bed and seat for use as resting furniture in a pick-up truck having a flat floor surface and a top shell covering and enclosing the back of said truck, said furniture being installed in said truck without alteration to the truck interior and comprising:

first, second and third generally flat, elongated essentially-rectangular platforms, each of said platforms having a frame and a body-supporting surface attached thereto, opposing ends of said frames being located a short distance inwardly of the internal sides of said truck while allowing the platforms to be either extended horizontally lengthwise of the truck from a crosswise, vertically-stacked seat form into a bed form or retracted and stacked vertically from bed form into seat form;

said furniture, when said platforms are stacked in seat form, having end-to-end and a front-to-back horizontal dimensions corresponding respectively to the length and width dimensions of said first platform;

first hinge means interconnecting adjacent side edges of said first and second platforms;

second hinge means interconnecting a side edge of said third platform to that side edge of said second platform opposite its side edge connected to the first platform;

said first and second hinge means providing a Z-fold capability enabling said second platform to be pivoted 180 degrees over and rest inverted atop and in contact with said first platform and further enabling said third platform to pivoted 180 degrees under with respect to said second platform whereby the underside of said third platform lies atop and in contact with the underside of said second platform when said furniture is place in seat form;

legs fixedly attached at each outer end of the frame of at least said first platform and said third platform for supporting said body-supporting surfaces in a horizontal plane above the floor surface when the platforms are extended horizontally into bed form to thereby provide storage space beneath the bed on said floor surface;

at least one of said first and third platforms being provided with vertically open spaces therethrough adjacent both ends of said at least one platform to permit passage therethrough of otherwise interfering legs of the other of said first and third platforms when said platforms are Z-folded into seat form;

means enabling manual grasping and lifting of said third platform from above and moving it toward or away from said first platform to convert said furniture between bed and seat form; and an individual cushion essentially of the same horizontal length and width dimensions as said platforms for each of said platforms, said cushions being arranged in abutting side edge relationship on said platforms to form a sleeping mattress when said furniture is placed in bed form and at least one said cushion providing a horizontal seating surface atop said third platform when said furniture is placed in seat form.

2. A manually convertible bed and seat for use as resting furniture in a pick-up truck having a flat floor surface and a top shell covering and enclosing the back of said truck, said furniture being installed in said truck without alteration to the truck interior and comprising:

first, second and third generally flat, elongated essentially-rectangular platforms, each of said platforms having a frame and a body-supporting surface attached thereto, opposing ends of said frame being located a short distance inwardly of the internal sides of said truck while allowing the platforms to be either extended horizontally lengthwise of the truck from a crosswise, vertically-stacked seat form into a bed form or retracted and stacked vertically from bed form into seat form;

said furniture, when said platforms are stacked in seat form, having side-to-side and a front-to-back horizontal dimensions corresponding respectively to the length and width dimensions of said first platform;

first hinge means interconnecting adjacent side edges of said first and second platforms;

second hinge means interconnecting a side edge of said third platform to that side edge of said second platform opposite its side edge connected to the first platform;

said first and second hinge means providing a Z-fold capability enabling said second platform to be pivoted 180 degrees over and rest inverted atop and in contact with said first platform and further enabling said third platform to be pivoted 180 degrees under with respect to said second platform whereby the underside of said third platform lies atop and in contact with the underside of said second platform when said furniture is placed in seat form;

leg mounted at each outer end of the frame of each said platform for supporting said body-supporting surfaces in a horizontal plane above the floor surface when the platforms are extended horizontally into bed form to thereby provide storage space beneath the bed on said floor surface;

the inner edges of the legs of said first platform being spaced apart at least forty-eight inches and inner edges of the legs of at least said second platform being spaced apart less than forty-eight inches whereby sheet building material placed flat on said floor surface and having a dimension of forty-eight inches laterally of the truck requires said furniture to be placed into seat form prior to placement of forty-eight inch wide building material flat beneath said furniture on said floor surface, said furniture being so constructed that the legs of said third platform are positioned above the floor surface whenever said furniture is placed in seat form so as to not obstruct placement of said building material on the truck floor surface;

means enabling manual grasping and lifting of said third platform from above and moving it toward or away from said first platform to convert said furniture between bed and seat form; and an individual cushion essentially of the same horizontal length and width dimensions as said platforms for each of said platforms, said cushion being arranged in abutting side edge relationship on said platforms to form a sleeping mattress when said furniture is placed in bed form and at least one said cushion providing a horizontal seating surface atop said third platform when said furniture is placed in seat form.

3. A manually convertible bed and seat for use as resting furniture in a pick-up truck having a flat floor surface and a top shell covering and enclosing the back of said truck, said furniture being installed in said truck without alteration to the truck interior and comprising:

first, second and third generally flat, elongated essentially-rectangular platforms, each of said platforms having a frame and a body-supporting surface attached thereto, opposing ends of said frames being located a short distance inwardly of the internal sides of said truck while allowing the platforms to be either extended horizontally lengthwise of the truck from a crosswise, vertically-stacked seat form into a bed form or retracted and stacked vertically from bed form into seat form;

said furniture, when said platforms are stacked in seat form, having end-to-end and a front-to-back horizontal dimensions corresponding respectively to the length and width dimensions of said first platform;

first hinge means interconnecting adjacent side edges of said first and second platforms;

second hinge means interconnecting a side edge of said third platform to that side edge of said second platform opposite its side edge connected to the first platform;

said first and second hinge means providing a Z-fold capability enabling said second platform to be pivoted 180 degrees over and rest inverted stop and in contact with said first platform and further enabling said third platform to be pivoted 180 degrees under with respect to said second platform whereby the underside of said third platform lies atop and in contact with the underside of said second platform when said furniture is placed in seat form;

legs mounted at each outer end of the frame of at least said first platform and said third platform for supporting said body-supporting surfaces in a horizontal plane above the floor surface when the platforms are extended horizontally into bed form to thereby provide storage space beneath the bed on said floor surface;

horizontally-adjustable bracing means extending between the ends of the frame of said first platform and internal side walls of said truck to prevent shifting of said furniture either during truck motion or resting thereon, in both seat form and bed form;

means enabling manual grasping and lifting of said third platform from above and moving it toward or away from said first platform to covert said furniture between bed and seat form; and an individual cushion essentially of the same horizontal length and width dimensions as said platforms for each of said platforms, said cushions being arranged in abutting side edge relationship on said platforms to form a sleeping mattress when said furniture is placed in bed form and at least one said cushion providing a horizontal seating surface atop said third platform when said furniture is placed in seat form.

4. A manually convertible bed and seat for use as resting furniture in a covered vehicle having a flat floor surface, said furniture comprising:

first, second and third generally flat, elongated essentially-rectangular platforms, each of said platforms having a frame and a body-supporting surface attached thereto, opposing ends of said frame being located a short distance inwardly of the internal sides of said vehicle while allowing the platforms to be either extended horizontally lengthwise of the vehicle from a crosswise, vertically-stacked seat form into a bed form or retracted and stacked vertically from bed form into seat form;

said furniture, when said platforms are stacked in seat form having end-to-end and a front-to-back horizontal dimensions corresponding respectively to the length and width dimensions of said first platform;

first hinge means interconnecting adjacent side edges of said first and second platforms;

second hinge means interconnecting a side edge of said third platform to that side edge of said second platform opposite its side edge connected to the first platform;

said first and second hinge means providing a Z-fold capability enabling said second platform to be pivoted 180 degrees over and rest inverted atop said first platform and further enabling said third platform to be pivoted 180 degrees under with respect to said second platform whereby the underside of said third platform lies atop the underside of said second platform when said furniture is placed in seat form;

legs attached to each outer end of the frame of each platform for supporting said body-supporting surfaces in a horizontal plane above the floor when the platforms are extended horizontally into bed form to thereby provide storage space beneath the bed on said vehicle floor surface, the legs for said third platform being offset laterally inwardly and out of alignment with the legs of said first and second platforms, a vertical open space being provided through and between the legs of said first and second platforms and opposing ends of their respective body-supporting surfaces, said vertical spaces being aligned in the direction of extension of said platforms with the legs of said third platform to enable the legs of said third platform to be received by said spaces when said second and third platforms are moved from bed form and stacked on the first platform in seat form; and an individual cushion essentially of the same horizontal length and width dimensions as said platforms for each of said platforms, said cushions being arranged in abutting side edge relationship on said platforms to form a sleeping mattress when said furniture is placed in bed form.

5. A manually convertible bed and seat according to claim 4 wherein, when said furniture is in seat form, two cushions lie horizontally above and on the stacked platforms and one cushion stands vertically on edge to form the back cushion of said seat.

6. A manually convertible bed and seat according to claim 5 wherein all of said legs are generally U-shaped and extend lengthwise of their respective platforms in the direction of extension of said platforms when in bed form.

7. A manually convertible bed and seat according to claim 6 wherein the bases of the inverted U-shaped legs of said second platform retain said two horizontal seat cushions therebetween when in seat form.

8. A manually convertible bed and seat according to claim 4 wherein horizontally adjustable bracing means extends between the ends of the frame of said first platform and internal side walls of said vehicle to prevent shifting of said furniture either during vehicle motion or resting thereon, in both seat form and bed form.

9. A manually convertible bed and seat according to claim 4 wherein said furniture is of a weight enabling easy portability thereof from inside said vehicle to an exterior location, for enabling use of said furniture as either a seat or bed in said latter location.

10. A manually convertible bed and seat according to claim 4 wherein said third platform is provided with a handle along its side edge remote from said second platform, and wherein a strap is provided at the upper side of the second platform in line with said handle along its side edge nearest said handle, whereby said strap and handle serve as lifting means for said second and third platforms enabling walking said platforms toward or away from said first platform to respectively retract or extend said platforms.

11. A manually convertible bed and seat for use as resting furniture in a pick-up truck having a flat floor surface and a top shell covering the back of said truck, said furniture comprising:

first, second and third generally flat, elongated essentially-rectangular platforms, each of said platforms having a frame and a body-supporting surface attached thereto, opposing ends of said frames being located a short distance inwardly of the internal sides of said truck while allowing the platforms to be either extended horizontally lengthwise of the truck from a crosswise, vertically-stacked stacked seat form into a bed form or retracted and stacked from bed form into seat form;

said furniture, when said platforms are stacked in seat form, having end-to-end and a front-to-back horizontal dimensions corresponding respectively to the length and width dimensions of said first platform;

first hinge means interconnecting adjacent side edges of said first and second platforms;

second hinge means interconnecting a side edge of said third platform to that side edge of said second platform opposite its side edge connected to the first platform;

said first and second hinge means providing a Z-fold capability enabling said second platform to the pivoted 180 degrees over and rest inverted atop said first platform and further enabling said third platform to be pivoted 180 degrees under with respect to said second platform whereby the underside of said third platform lies atop the underside of said second platform when said furniture is placed in seat form;

legs attached to each outer end of the frame of each platform for supporting said body-supporting surfaces in a horizontal plane above the floor when the platforms are extended horizontally into bed form to thereby provide storage space beneath the bed on said truck floor surface, the legs for said third platform being offset laterally inwardly and out of alignment with the legs of said first and second platforms, a vertical open space being provided through and between the legs of said first and second platforms and opposing ends of their respective body-supporting surfaces, said vertical spaces being aligned in the direction of extension of said platforms with the legs of said third platform to enable the legs of said third platform to be received by said spaces when said second and third platforms are moved from bed form and stacked on the first platform in seat form; and an individual cushion essentially of the same horizontal length and width dimensions as said platforms for each of said platforms, said cushions being arranged in abutting side edge relationship on said platforms to form a sleeping mattress when said furniture is placed in bed form.

12. A manually convertible bed and sea according to claim 11 wherein said truck floor surface has inwardly-protruding wheel wells, and wherein said second platform legs are closely adjacent said wells when the furniture is extended into bed form.

13. A manually convertible bed and seat according to claim 11 wherein the inside edges of legs of said first platform are spaced apart in excess of 48 inches and the inside edges of the legs of said third platform are spaced apart less than 48 inches, wherein, when said platforms are stacked in seat form, the legs of said third platform are spaced above the floor of said truck to enable 48-inch wide sheet building material to be located beneath said seat below the legs of said third platform.

14. A manually convertible bed and seat according to claim 11 wherein horizontally adjustable bracing means extends between the ends of the frame of said first platform and internal side walls of said truck to prevent shifting of said furniture either during truck motion or resting thereon, in both seat form and bed form.

15. A manually convertible bed and seat according to claim 11 where in said third platform is provided with a handle along its side edge remote from said second platform, and wherein a strap is provided at the upper side of the second platform along its side edge nearest said handle, whereby said strap and handle serve as lifting means for said second and third platforms enabling walking said platforms toward or away from said first platform to respectively retract or extend said platforms.

16. A manually convertible bed and seat according to claim 11 wherein means tis provided for interconnecting said cushions to retain their shape as a mattress when in bed form, said means being disconnectable to enable said cushions to be separated for stacking when placed in seat form.

17. A manually convertible bed and seat according to claim 11 wherein each said frame has one 90 degree relatively sharp corner and one radiused corner at each end, with the radiused corners being positioned on the same side edge of each frame, all of said radiused corners of the frames of the first, second and third platforms being generally aligned vertically at the two frontward corners of said seat when said platforms are Z-folded into seat form.

* * * * *